(12) United States Patent
Shidou et al.

(10) Patent No.: US 9,193,825 B2
(45) Date of Patent: Nov. 24, 2015

(54) POLYCARBONATE RESIN, POLYCARBONATE RESIN COMPOSITION AND MOLDED ARTICLE THEREOF

(71) Applicant: MITSUBISHI CHEMICAL CORPORATION, Chiyoda-ku (JP)

(72) Inventors: Masahide Shidou, Mie (JP); Tatsuya Hitomi, Mie (JP)

(73) Assignee: MITSUBISHI CHEMICAL CORPORATION, Chiyoda-ku (JP)

(*) Notice: Subject to any disclaimer, the term of this patent is extended or adjusted under 35 U.S.C. 154(b) by 0 days.

(21) Appl. No.: 14/502,178

(22) Filed: Sep. 30, 2014

(65) Prior Publication Data

US 2015/0018510 A1    Jan. 15, 2015

Related U.S. Application Data

(63) Continuation of application No. PCT/JP2013/058875, filed on Mar. 26, 2013.

(30) Foreign Application Priority Data

Mar. 30, 2012 (JP) ................ 2012-081759
Mar. 30, 2012 (JP) ................ 2012-081760

(51) Int. Cl.
| | | |
|---|---|---|
| C08G 64/00 | (2006.01) | |
| C08G 64/06 | (2006.01) | |
| C08G 64/42 | (2006.01) | |
| C08G 64/14 | (2006.01) | |
| B29C 45/00 | (2006.01) | |
| C08G 63/02 | (2006.01) | |
| B29K 69/00 | (2006.01) | |

(52) U.S. Cl.
CPC ............ *C08G 64/06* (2013.01); *B29C 45/0001* (2013.01); *C08G 64/14* (2013.01); *C08G 64/42* (2013.01); *B29K 2069/00* (2013.01); *B29K 2995/007* (2013.01); *B29K 2995/0016* (2013.01)

(58) Field of Classification Search
CPC .................................................. C08G 64/307
USPC ................................................. 528/196, 198
See application file for complete search history.

(56) References Cited

U.S. PATENT DOCUMENTS

| | | |
|---|---|---|
| 5,646,233 A | 7/1997 | Sakashita et al. |
| 5,859,172 A | 1/1999 | Sakashita et al. |
| 5,880,248 A | 3/1999 | Sakashita et al. |
| 2010/0244303 A1* | 9/2010 | Uchimura et al. ............ 264/148 |
| 2013/0030113 A1 | 1/2013 | Hitomi et al. |
| 2014/0147651 A1 | 5/2014 | Hitomi et al. |

FOREIGN PATENT DOCUMENTS

| | | |
|---|---|---|
| CN | 101489749 A | 7/2009 |
| EP | 2 174 970 | 4/2010 |
| JP | 64-069625 | 3/1989 |
| JP | 8-183852 | 7/1996 |
| JP | 2009-52026 | 3/2009 |
| JP | 2010-188719 | 9/2010 |
| JP | 2011-105931 | 6/2011 |
| JP | 2011-105932 | 6/2011 |
| JP | 2011-219636 | 11/2011 |
| JP | 2011-225862 | 11/2011 |
| JP | 2011-252060 | 12/2011 |
| JP | 2013-014728 | 1/2013 |
| WO | 2009/083933 | 7/2009 |
| WO | WO 2011/125896 A1 | 10/2011 |

OTHER PUBLICATIONS

International Search Report issued May 7, 2013 in PCT/JP2013/058875 filed Mar. 26, 2013.
Extended European Search Report issued Mar. 24, 2015 in Patent Application No. 13768148.2.
Office Action issued Aug. 21, 2015, in Chinese Patent Application No. 201380017000.6 filed Mar. 26, 2013 (with English translation).

* cited by examiner

*Primary Examiner* — Terressa Boykin
(74) *Attorney, Agent, or Firm* — Oblon, McClelland, Maier & Neustadt, L.L.P.

(57) ABSTRACT

The present invention relates to a polycarbonate resin having, in the molecule, at least a structural unit represented by the following formula (1), wherein the terminal hydroxyl group concentration of the polycarbonate resin is 300 ppm or less:

$$\left[ O - \underset{R^1}{\underset{|}{\bigcirc}} - X - \underset{R^2}{\underset{|}{\bigcirc}} - O - \underset{\underset{O}{\|}}{C} \right] \quad (1)$$

wherein each of $R^1$ and $R^2$ independently represents a substituted or unsubstituted alkyl group having a carbon number of 1 to 20 or a substituted or unsubstituted aryl group, and X represents a single bond, a carbonyl group, a substituted or unsubstituted alkylidene group, a substituted or unsubstituted sulfur atom, or an oxygen atom.

13 Claims, No Drawings

POLYCARBONATE RESIN, POLYCARBONATE RESIN COMPOSITION AND MOLDED ARTICLE THEREOF

TECHNICAL FIELD

The present invention relates to a polycarbonate resin, a polycarbonate resin composition, and a molded article thereof. More specifically, the present invention relates to a polycarbonate resin having high surface hardness and high flame retardancy, a polycarbonate resin composition, and a molded article using the same.

BACKGROUND ART

A polycarbonate resin is excellent in the mechanical strength, electrical properties, transparency, etc. and is widely utilized as an engineering plastic in various fields such as electric/electronic device field and automotive field. Recently, in these application fields, reduction in the thickness, size and weight of a molded/processed product has progressed, and the performance of a molding material is required to be more enhanced. Among these, development of a polycarbonate resin having high flame retardancy even with a small thickness is desired, and several proposals have been made thereon.

For example, a method for making a polycarbonate or copolycarbonate having an excellent surface hardness by using bisphenols different from the conventional bisphenol A (Patent Document 1 or 2), and a method for balancing flowability and hardness by blending a dimethyl bisphenol cyclohexane-type polycarbonate and a bisphenol A-type polycarbonate (Patent Document 3), are known.

On the other hand, in Patent Document 4, a technique of incorporating a branching agent (a monomer having three or more reactive groups; a unit capable of becoming a repeating unit) and thereby partially introducing a branch structure so as to enhance the flame retardancy is known. However, introduction of a branching agent makes it difficult to control the extent of crosslinking produced at the time of polymerization of a polymer, and there is a problem that a gel-like substance is produced and causes a foreign matter.

BACKGROUND ART DOCUMENT

Patent Document

Patent Document 1: JP-A-64-069625 (the term "JP-A" as used herein means an "unexamined published Japanese patent application")
Patent Document 2: JP-A-08-183852
Patent Document 3: International Publication No. 2009/083933
Patent Document 4: JP-A-2011-105932

SUMMARY OF INVENTION

Problem that Invention is to Solve

In this way, as regards the materials obtained by conventional methods, a polycarbonate resin having high surface hardness (pencil hardness) and at the same time, being excellent in the flame retardancy cannot be obtained.

Under these circumstances, an object of the present invention is to provide a polycarbonate resin having high hardness and flame retardancy, a resin composition, and a molded article thereof.

Means for Solving Problem

As a result of many intensive studies to attain the above-described object, the present inventors have focused attention on the branch structure and its amount in a polycarbonate resin and have accomplished the present invention.

The conventional polycarbonate resin (a polycarbonate resin having 2,2'-bis(4-hydroxyphenyl)propane as a repeating structural unit) usually does not form a branch structure depending on the heat treatment of the polymer. On the other hand, in the method of introducing a branching agent so as to enhance the flame retardancy, as described above, the extent of crosslinking produced in the process of polymerization can be hardly controlled.

The present inventors have found that when a specific repeating unit structure is incorporated into the polycarbonate resin, a branch structure can be produced after performing a heat treatment to polymerize a polymer, and have achieved enhancing the flame retardancy without involving production of a foreign matter such as gel-like substance.

That is, the present invention relates to the following aspects [1] to [15].

[1] A polycarbonate resin having, in a molecule, at least a structural unit represented by the following formula (1), wherein a terminal hydroxyl group concentration of the polycarbonate resin is 300 ppm or less; compounds obtained by alkali hydrolysis of the polycarbonate resin contain at least a compound represented by the following formula (3), in addition to a compound represented by the following formula (2); and an amount of the compound represented by the following formula (3) is from 500 to 7,000 ppm based on all compounds obtained by alkali hydrolysis of the polycarbonate resin:

[Chem. 1]

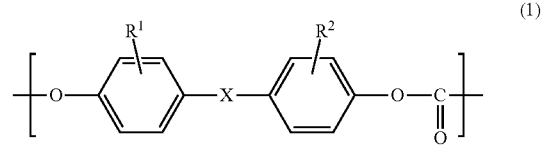

[Chem. 2]

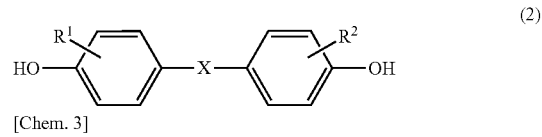

[Chem. 3]

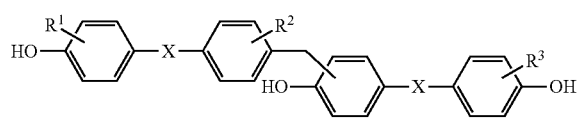

(in formula (1), (2) or (3), each of $R^1$, $R^2$ and $R^3$ independently represents a substituted or unsubstituted alkyl group having a carbon number of 1 to 20 or a substituted or unsubstituted aryl group, and X represents a single bond, a carbonyl group, a substituted or unsubstituted alkylidene group, a substituted or unsubstituted sulfur atom, or an oxygen atom).

[2] A polycarbonate resin having, in a molecule, at least a structural unit represented by the following formula (1), wherein a total content of phenol compounds having a carbon number of 6 to 18 in the polycarbonate resin is 100 ppm or less, compounds obtained by alkali hydrolysis of the polycarbonate resin contain at least a compound represented by the following formula (3), in addition to a compound represented by the following formula (2), and an amount of the compound represented by the following formula (3) is from 500 to 7,000 ppm based on all compounds obtained by alkali hydrolysis of the polycarbonate resin:

[Chem. 4]

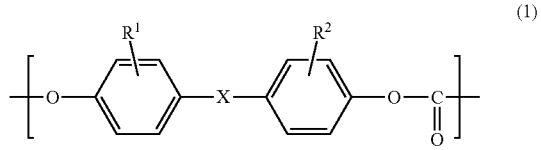
(1)

[Chem. 5]

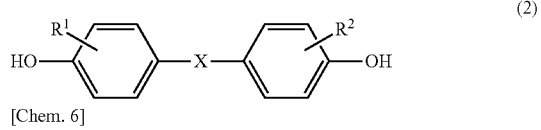
(2)

[Chem. 6]

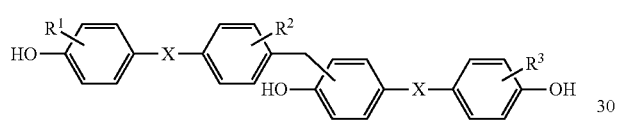
(3)

(in formula (1), (2) or (3), each of $R^1$, $R^2$ and $R^3$ independently represents a substituted or unsubstituted alkyl group having a carbon number of 1 to 20 or a substituted or unsubstituted aryl group, and X represents a single bond, a carbonyl group, a substituted or unsubstituted alkylidene group, a substituted or unsubstituted sulfur atom, or an oxygen atom).

[3] The polycarbonate resin as described in the above [1] or [2], wherein a chlorine atom content in the polycarbonate resin is 10 ppm or less.

[4] The polycarbonate resin as described in any one of the above [1] to [3], wherein the compounds obtained by alkali hydrolysis of said polycarbonate resin contain a compound represented by the following formula (4) and an amount of the compound represented by the following formula (4) is 1 ppm or more based on all the compounds obtained by alkali hydrolysis of the polycarbonate resin:

[Chem. 7]

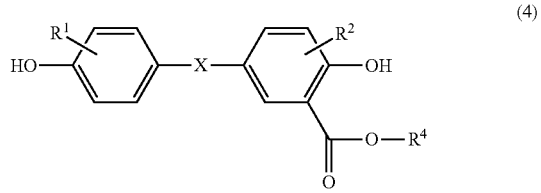
(4)

(in formula (4), $R^1$, $R^2$ and X have the same meanings as in formula (1), and $R^4$ represents a hydrogen atom, a substituted or unsubstituted alkyl group having a carbon number of 1 to 20 or a substituted or unsubstituted aryl group).

[5] The polycarbonate resin as described in the above [4], wherein a total amount of the compound represented by formula (3) and the compound represented by formula (4), which are contained in the compounds obtained by alkali hydrolysis of said polycarbonate resin, is 500 ppm or more based on all compounds obtained by alkali hydrolysis of the polycarbonate resin.

[6] The polycarbonate resin as described in the above [4] or [5], wherein an amount of the compound represented by formula (4) contained in the compounds obtained by alkali hydrolysis of said polycarbonate resin is, in terms of weight ratio to the compound represented by formula (3), from more than 0 to less than 1.

[7] The polycarbonate resin as described in any one of the above [1] to [6], wherein $R^1$ and $R^2$ in formula (1) are a substituted or unsubstituted alkyl group having a carbon number of 1 to 20.

[8] The polycarbonate resin as described in any one of the above [1] to [7], wherein said polycarbonate resin further contains a structural unit derived from 1,1,1-tris-(4-hydroxyphenyl)ethane.

[9] The polycarbonate resin as described in any one of the above [1] to [8], wherein a viscosity average molecular weight is from 10,000 to 45,000.

[10] The polycarbonate resin as described in any one of the above [1] to [9], wherein said polycarbonate resin is a polycarbonate resin produced by an interfacial polycondensation method.

[11] The polycarbonate resin as described in any one of the above [1] to [10], wherein said polycarbonate resin is a polycarbonate resin obtained by subjecting a polycarbonate resin (A) obtained by an interfacial polycondensation method or a melt polycondensation method to a heat treatment at 260° C. or more.

[12] A polycarbonate resin composition containing the polycarbonate resin claimed in any one of the above [1] to [11].

[13] A molded article obtained by molding the polycarbonate resin composition described in the above [12].

[14] A molded article obtained by molding the polycarbonate resin described in the above [12] by an injection molding method.

[15] A molded article obtained by molding the polycarbonate resin described in the above [12] by an extrusion molding method.

Advantageous Effects of Invention

According to the present invention, a polycarbonate resin excellent in the surface hardness and having flame retardancy can be obtained. The present invention is a polycarbonate resin in which the amount of branching of the polycarbonate resin is controlled and which has flame retardancy.

MODE FOR CARRYING OUT INVENTION

The mode for carrying out the present invention is described in detail below, but the constituent requirements described below are an example (representative example) of the embodiment of the present invention, and the present invention is not limited to the following contents as long as its gist is observed. Incidentally, the expression "(numerical or physical value) to (numerical or physical value)" as used in the present invention is intended to include the numerical or physical values before and after "to".

Also, in the present invention, the branch indicates a branch contained in a structural unit of the polycarbonate resin. As in the later-described compounds of formula (3) and (4), the branch encompasses not only a branch derived from a compound having three or more reactive groups such as hydroxyl group or carboxyl group but also all branch structures, e.g., a branch derived from the branching agent or copolymerization component added and a branch derived from the mixed component (preferably a branch derived from bisphenol A polycarbonate).

The amount of branching in a structural unit of the polycarbonate resin can be determined by identifying the compound obtained by the hydrolysis of the polycarbonate resin.

More specifically, in determining the amount of branching, the resin is decomposed into monomers by hydrolysis and the weight fraction of the monomer having three or more functional groups (reactive functional group: hydroxyl group, carboxyl group) is measured by liquid chromatography (LC). Incidentally, the carbonate bonding moiety becomes $CO_2$ at the time of measurement, which escapes to the outside of the system and is not detected, and therefore, the amount of the compound having substantially three or more functional groups is the amount of branching.

The present invention relates to a polycarbonate resin having, in the molecule, at least a structural unit represented by the following formula (1), wherein the terminal hydroxyl group concentration of the polycarbonate resin is 300 ppm or less, the compounds obtained by alkali hydrolysis of the polycarbonate resin contain at least a compound represented by the following formula (3), in addition to a compound represented by the following formula (2), and the amount of the compound represented by the following formula (3) is from 500 to 7,000 ppm based on all compounds obtained by alkali hydrolysis of the polycarbonate resin:

[Chem. 8]

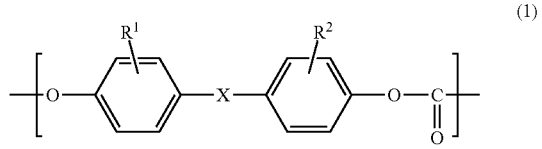

(1)

[Chem. 9]

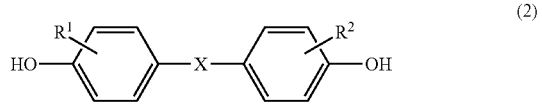

(2)

[Chem. 10]

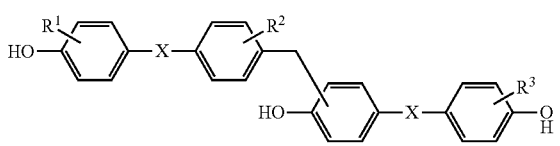

(3)

(in formula (1), (2) or (3), each of $R^1$, $R^2$ and $R^3$ independently represents a substituted or unsubstituted alkyl group having a carbon number of 1 to 20 or a substituted or unsubstituted aryl group, and X represents a single bond, a carbonyl group, a substituted or unsubstituted alkylidene group, a substituted or unsubstituted sulfur atom, or an oxygen atom).

By virtue of having such a configuration, the polycarbonate resin of the present invention is excellent in the surface hardness, has flame retardancy and produces little foreign matter.

Here, the polycarbonate resin of the present invention is a polycarbonate resin having, in the molecule, at least a repeating unit represented by formula (1). Also, the expression "having, in the molecule, at least a repeating unit represented by formula (1)" means that the polycarbonate resin is partially or entirely composed of a repeating unit represented by formula (1).

The polycarbonate resin portion having a repeating unit represented by formula (1) accounts for preferably 1 wt % or more, more preferably 5 wt % or more, still more preferably 10 wt % or more, and most preferably 20 wt % or more, in the entire polycarbonate resin.

The polycarbonate resin is described specifically below.

<Polycarbonate Resin>

The polycarbonate resin has, in the molecule, at least a repeating unit represented by the following formula (1):

[Chem. 11]

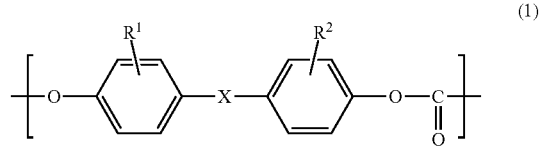

(1)

In formula (1), each of $R^1$ and $R^2$ independently represents a substituted or unsubstituted alkyl group having a carbon number of 1 to 20 or a substituted or unsubstituted aryl group, and X represents a single bond, a carbonyl group, a substituted or unsubstituted alkylidene group, a substituted or unsubstituted sulfur atom, or an oxygen atom. Among these, $R^1$ and $R^2$ are preferably a substituted or unsubstituted alkyl group having a carbon number of 1 to 20.

In formula (1), the substituted or unsubstituted alkyl group having a carbon number of 1 to 20 of $R^1$ and $R^2$ includes, for example, a methyl group, an ethyl group, an n-propyl group, an isopropyl group, an n-butyl group, an isobutyl group, a sec-butyl group, a tert-butyl group, an n-pentyl group, a sec-pentyl group, an n-hexyl group, an n-heptyl group, and an n-octyl group, and the substituted or unsubstituted aryl group includes, for example, a phenyl group, a benzyl group, a tolyl group, a 4-methylphenyl group, and a naphthyl group.

Among these, $R^1$ and $R^2$ are preferably a methyl group, an ethyl group, an n-propyl group or a 4-methylphenyl group, more preferably a methyl group. Here, each of the bonding positions of $R^1$ and $R^2$ in formula (1) is an arbitrary position selected from 2-position, 3-position, 5-position and 6-position relative to X on the phenyl group, and is preferably 3-position or 5-position.

Also, in formula (1), X represents a single bond, a carbonyl group, a substituted or unsubstituted alkylidene group, a substituted or unsubstituted sulfur atom, or an oxygen atom. In the case of a substituted or unsubstituted alkylidene group, X is represented by the following structural formula (5). The substituted or unsubstituted sulfur atom of X includes, for example, —S— and —$SO_2$—.

[Chem. 12]

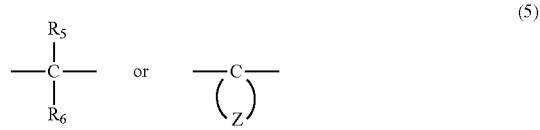

(5)

In formula (5), each of $R_5$ and $R_6$ independently represents a hydrogen atom, a substituted or unsubstituted alkyl group having a carbon number of 1 to 20, or a substituted or unsubstituted aryl group, and Z represents a substituted or unsubstituted alkylene group having a carbon number of 4 to 20, or a polymethylene group.

The substituted or unsubstituted alkyl group having a carbon number of 1 to 20 of $R_5$ and $R_6$ includes, for example, a methyl group, an ethyl group, an n-propyl group, an isopropyl group, an n-butyl group, an isobutyl group, a sec-butyl group, a tert-butyl group, an n-pentyl group, a sec-pentyl group, an n-hexyl group, an n-heptyl group, and an n-octyl group, and the substituted or unsubstituted aryl group includes, for example, a phenyl group, a benzyl group, a tolyl group, a 4-methylphenyl group, and a naphthyl group.

Among these, $R_5$ and $R_6$ are preferably a methyl group, an ethyl group, an n-propyl group or a 4-methylphenyl group, more preferably a methyl group.

In the formula above, Z binds to the carbon bonded to two phenyl groups and thereby forms a substituted or unsubstituted divalent carbon ring. The divalent carbon ring includes, for example, a cycloalkylidene group (preferably having a carbon number of 4 to 12) such as cyclopentylidene group, cyclohexylidene group, cycloheptylidene group, cyclododecylidene group and adamantylidene group, and the substituted carbon ring includes, for example, those described above each having a methyl substituent or an ethyl substituent. Among these, cyclohexylidene group, a methyl substitution of cyclohexylidene group and cyclododecylidene group are preferable.

Such a polycarbonate resin includes a polycarbonate resin containing a structural unit derived from a compound represented by the following formula (2):

[Chem. 13]

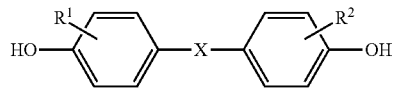
(2)

In formula (2), $R^1$, $R^2$ and X have the same meanings as $R^1$, $R^2$ and X in formula (1).

A polycarbonate resin containing a structural unit derived from, among the compounds represented by formula (2), at least one compound selected from the group consisting of the following formulae (2a) to (2g) is suitably used.

[Chem. 14]

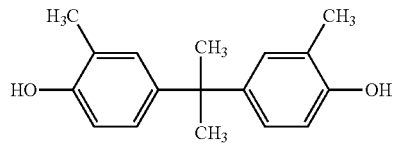
(2a)

[Chem. 15]

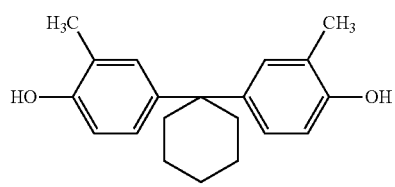
(2b)

[Chem. 16]

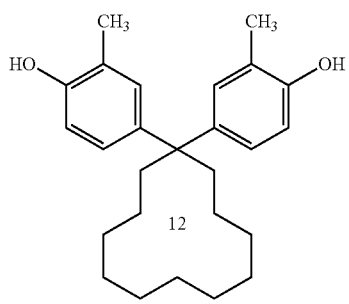
(2c)

[Chem. 17]

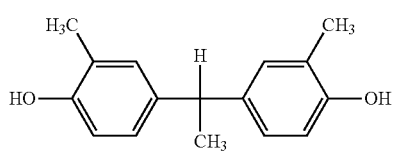
(2d)

[Chem. 18]

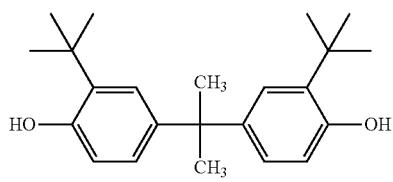
(2e)

[Chem. 19]

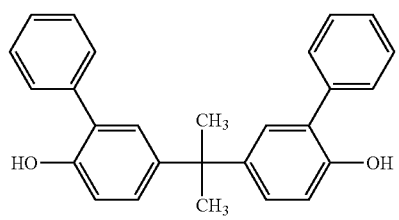
(2f)

[Chem. 20]

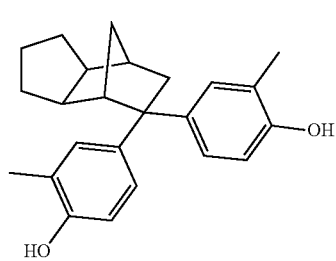
(2g)

Above all, a polycarbonate resin containing a structural unit derived from, among the compounds above, at least one compound selected from the group consisting of formulae (2a) to (2c) is more preferably used.

The polycarbonate resin may contain a structural unit other than the repeating unit represented by formula (1), as long as its performance is not impaired.

Such a structural unit is not particularly limited but specifically includes structural units derived from 2,2-bis(4-hydroxyphenyl)propane (hereinafter, sometimes referred to as "bisphenol A"), an alicyclic dihydroxy compound such as anhydrous sugar alcohol, and a cyclic ether compound such as Spiro glycol. Among these, a structural unit derived from bisphenol A is preferred.

As described above, the content of the repeating unit represented by formula (1) in the polycarbonate resin is preferably 1 wt % or more, more preferably 5 wt % or more, still more preferably 10 wt % or more, and most preferably 20 wt % or more.

In the polycarbonate resin of the present invention, the terminal hydroxyl group concentration of the polycarbonate resin is 300 ppm or less, preferably 200 ppm or less, more preferably 50 ppm or less, and is preferably 10 ppm or more, more preferably 30 ppm or more. When the terminal hydroxyl group concentration of the polycarbonate resin is in this range, melt-molding of the polycarbonate resin hardly involves production of a further branch and in turn, a foreign matter is less likely to be generated. On the other hand, if the terminal hydroxyl group concentration is higher than the range above, production of a further branch is prone to occur and a foreign matter is readily generated. The terminal hydroxyl group concentration can be measured, for example, by a method of causing the terminal hydroxyl group of the polycarbonate resin to develop color with titanium tetrachloride in a methylene chloride solution in the presence of acetic acid, and determining the concentration from the absorbance, and this method is described later in Examples.

In the polycarbonate resin of the present invention, the compounds obtained by alkali hydrolysis of the polycarbonate resin contain at least a compound represented by the following formula (3), in addition to a compound represented by the following formula (2), and the amount of the compound represented by the following formula (3) is from 500 to 7,000 ppm based on all compounds obtained by alkali hydrolysis of the polycarbonate resin.

[Chem. 21]

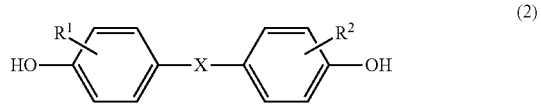

(2)

[Chem. 22]

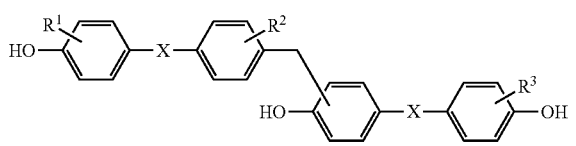

(3)

In formulae (2) and (3), each of $R^1$, $R^2$ and $R^3$ independently represents a substituted or unsubstituted alkyl group having a carbon number of 1 to 20 or a substituted or unsubstituted aryl group, and X represents a single bond, a carbonyl group, a substituted or unsubstituted alkylidene group, a substituted or unsubstituted sulfur atom, or an oxygen atom.

Also, in the polycarbonate resin, the amount of the compound represented by formula (3) contained in the compounds obtained by alkali hydrolysis of the polycarbonate resin is from 500 ppm or more, preferably 700 ppm or more, more preferably 1,000 ppm or more, still more preferably 1,500 ppm or more, in terms of weight fraction in all compounds obtained by alkali hydrolysis. The upper limit is 7,000 ppm or less, preferably 5,000 ppm or less, more preferably 4,000 ppm or less.

If the content of the compound represented by formula (3) is less than 500 ppm, a sufficient flame-retardant effect may not be brought out, whereas if the content exceeds 7,000 ppm, a gel-like material giving rise to a foreign matter may be produced.

In the polycarbonate resin of the present invention, the compounds obtained by alkali hydrolysis of the polycarbonate resin preferably contain a compound represented by the following formula (4). The amount of the compound represented by the following formula (4) is preferably 1 ppm or more, more preferably 10 ppm or more, in terms of weight fraction in all compounds obtained by alkali hydrolysis of the polycarbonate resin.

[Chem. 23]

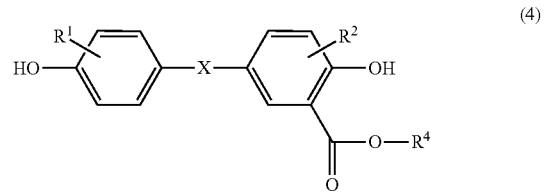

(4)

In formula (4), each of $R^1$ and $R^2$ independently represents a substituted or unsubstituted alkyl group having a carbon number of 1 to 20 or a substituted or unsubstituted aryl group, and X represents a single bond, a carbonyl group, a substituted or unsubstituted alkylidene group, a substituted or unsubstituted sulfur atom, or an oxygen atom. Also, $R^4$ represents a hydrogen atom, a substituted or unsubstituted alkyl group having a carbon number of 1 to 20, or a substituted or unsubstituted aryl group.

Furthermore, the amount of the compound represented by formula (4) contained in the compounds obtained by alkali hydrolysis of the polycarbonate resin is, in terms of weight ratio to the compound represented by formula (3) ["compound of formula (4)"/"compound of formula (3)"), preferably from more than 0 to less than 1, more preferably from more than 0 to less than 0.5. Here, in determining the weight ratio of the compound represented by formula (4) contained in the compounds obtained by alkali hydrolysis of the polycarbonate resin to the compound represented by formula (3), the weight ratio can also be calculated based on the value (unit: ppm) obtained by determining the amount of the compound represented by formula (3) or (4) contained in the compounds obtained by alkali hydrolysis of the polycarbonate resin, in terms of weight fraction in all compounds obtained by alkali hydrolysis of the polycarbonate resin.

In the polycarbonate resin after heat treatment of the present invention, the total amount of the compound represented by formula (3) and the compound represented by formula (4), which are contained in the compounds obtained by alkali hydrolysis of the polycarbonate resin, is 500 ppm or more, preferably 1,000 ppm or more, more preferably 2,000 ppm or more, based on all compounds obtained by alkali hydrolysis of the polycarbonate resin. The upper limit is preferably 7,000 ppm or less, more preferably 5,000 ppm or less, still more preferably 4,000 ppm or less.

If the total amount of the compound represented by formula (3) and the compound represented by formula (4) is less than 500 ppm based on all compounds obtained by alkali hydrolysis of the polycarbonate resin, a sufficient flame-retardant effect may not be brought out, whereas if the total amount exceeds 7,000 ppm, a gel-like material giving rise to a foreign matter may be produced.

The present invention also relates to a polycarbonate resin having, in the molecule, at least a structural unit represented by the following formula (1), wherein the total content of phenol compounds having a carbon number of 6 to 18 in the polycarbonate resin is 100 ppm or less, the compounds obtained by alkali hydrolysis of the polycarbonate resin contain at least a compound represented by the following formula (3), in addition to a compound represented by the following formula (2), and the amount of the compound represented by the following formula (3) is from 500 to 7,000 ppm based on all compounds obtained by alkali hydrolysis of the polycarbonate resin:

[Chem. 24]

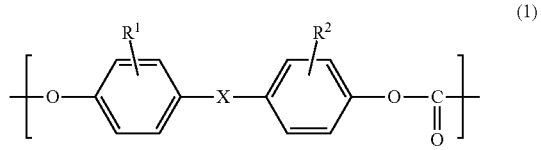

(1)

[Chem. 25]

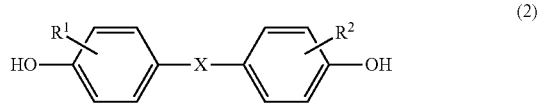

(2)

[Chem. 26]

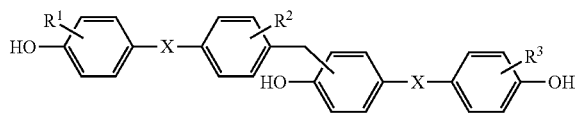

(3)

(in formula (1), (2) or (3), each of $R^1$, $R^2$ and $R^3$ independently represents a substituted or unsubstituted alkyl group having a carbon number of 1 to 20 or a substituted or unsubstituted aryl group, and X represents a single bond, a carbonyl group, a substituted or unsubstituted alkylidene group, a substituted or unsubstituted sulfur atom, or an oxygen atom).

The total content of phenol compounds having a carbon number of 6 to 18 in the polycarbonate resin of the present invention is 100 ppm or less. In the present invention, the phenol compound having a carbon number of 6 to 18 indicates a compound having a phenol structure such as phenol (carbon number: 6), 2,2-bis(4-hydroxyphenyl)propane (hereinafter, sometimes referred to as "bisphenol A" or "BPA", carbon number: 15), 2,2-bis(4-hydroxy-3-methylphenyl)propane (hereinafter, sometimes referred to as "bisphenol C" or "BPC", carbon number: 17) and p-tert-butylphenol, and having a carbon number of 6 to 18. The content of these compounds can be measured by liquid chromatography, etc. as described in Examples later.

The content of phenol compounds having a carbon number of 6 to 18 is 100 ppm or less, preferably 50 ppm or less. When the content of phenol compounds having a carbon number of 6 to 18 is in this range, melt-molding of the polycarbonate resin hardly involves production of a further branch and in turn, generation of a foreign matter is less likely to occur. On the other hand, if the content of phenol compounds having a carbon number of 6 to 18 exceeds 100 ppm, production of a further branch is prone to occur and a foreign matter is readily generated. The lower limit is preferably 0 ppm but is practically 1 ppm or more. Alternatively, the lower limit is below the measurable lower-limit value of the measuring method and for each component, is sometimes 0 ppm (undetectable).

In the polycarbonate resin of the present invention, the chlorine atom content in the polycarbonate resin is preferably 10 ppm or less. The chlorine atom content can be measured by a combustion chlorine method. If the chlorine atom content exceeds 10 ppm, production of a further branch is prone to occur and a foreign matter may be generated. Also, melt-molding may involve corrosion of a metal-made cylinder or a metal mold, disadvantageously resulting in mixing of a metal in the molded article or yellowing of the molded article. The chlorine atom content is preferably 0 ppm, and the content is below the measurable lower-limit value of the measuring method and is sometimes 0 ppm (undetectable).

The polycarbonate resin of the present invention preferably contains a structural unit derived from a branching agent. The branching agent includes, for example, 1,1,1-tris-(4-hydroxyphenyl)ethane, 2,4-bis(4-hydroxyphenylisopropyl)phenol, 2,6-bis(2-hydroxy-5-methylbenzyl)-4-methylphenol, 2-(4-hydroxyphenyl)-2-(2,4-dihydroxyphenyl)propane, and 1,4-bis(4,4'-dihydroxytriphenylmethyl)benzene. In addition, 2,4-dihydroxybenzoic acid, trimesic acid, cyanuric chloride, etc. may also be used. Among these, a branching agent having at least three phenolic hydroxyl groups is suitable. Among these, 1,1,1-tris-(4-hydroxyphenyl)ethane is suitably used. Therefore, it is preferred that the polycarbonate resin of the present invention produced preferably using a branching agent contains a structural unit derived from 1,1,1-tris-(4-hydroxyphenyl)ethane.

Usually, the amount of the branching agent used is preferably 0.01 mol or more, more preferably 0.02 mol or more, still more preferably 0.05 mol or more, most preferably 0.1 mol or more, and is preferably 5 mol % or less, more preferably 3 mol % or less, still more preferably 2 mol % or less, most preferably 1 mol % or less, based on the dihydroxy compound.

The viscosity average molecular weight of the polycarbonate resin is usually from 1,000 to 100,000, preferably from 10,000 to 45,000, more preferably from 15,000 to 35,000, still more preferably from 20,000 to 30,000. An excessively high viscosity average molecular weight is not preferred, because the melt viscosity of the polycarbonate resin may rise or the effect of enhancing the surface hardness may be deteriorated. Also, an excessively low viscosity average molecular weight is not preferred, because the effect of enhancing the surface hardness may be deteriorated or the impact resistance, strength, etc. may be reduced.

The pencil hardness of the polycarbonate resin of the present invention as specified by ISO 15184 is usually FIB or more, preferably F or more, more preferably H or more. If the pencil hardness is low, the surface hardness is reduced, and a molded article formed may be readily scratched.

The yellow index (YI) of the polycarbonate resin of the present invention is usually 4.0 or less, preferably 3.5 or less, more preferably 3.0 or less, still more preferably 2.5 or less. If YI is too high, the color tone becomes bad, leading to poor decorative property as a molded article and among others, a molded article requiring coloring may lack brightness and be dull-colored.

The polycarbonate resin is obtained, as described later, through polycondensation by an interfacial polycondensation method, a melt polycondensation method or the like using a dihydroxy compound and a carbonyl compound. Above all, the polycarbonate resin of the present invention is preferably a polycarbonate resin produced by an interfacial polycondensation method. The polycarbonate resin obtained by such a polymerization method satisfies the above-described requirements of the present invention and therefore, can be used as a polycarbonate resin having high surface hardness and high flame retardancy.

On the other hand, a polycarbonate resin satisfying the requirements of the present invention can be obtained through a post-step of heat-treating a polycarbonate resin not satisfying the requirements of the present invention formed. The method for obtaining the polycarbonate resin of the present invention through a post-step includes, for example, a method where a polycarbonate resin (A) produced by an interfacial polycondensation method or a melt polycondensation method is heat-treated at 260° C. or more. In the present invention, the heat treatment may be performed by any method but is a process of increasing the amount of branching of the polycarbonate resin by heating. The heat treatment is described below. Incidentally, for the sake of differentiating the polycarbonate resin before heat treatment from the polycarbonate resin after heat treatment, the expression "polycarbonate resin (A)" is used, and this resin indicates a polycarbonate resin that is subjected to a heat treatment and after the heat treatment, becomes a polycarbonate resin satisfying the constituent requirements of the present invention, such as terminal hydroxyl group concentration or amount of the compound represented by formula (3).

The heat treatment method may be in-tank heating of a batch system, in-tank heating of a continuous system, or heating by a melt extruder. In the heating by an extruder, the system may be controlled by the tank temperature or the desired temperature may be achieved by adjusting the rotation speed to increase or decrease the shear heat generation. In the case of heating by an extruder, the residence time is calculated from the extrusion rate and the internal volume of the barrel.

The heat treatment temperature is preferably from 200 to 400° C., more preferably from 260 to 380° C., still more preferably from 270 to 360° C., yet still more preferably from 280 to 350° C. If the temperature is too much raised, the amount of branching is excessively increased, and a material insoluble in an organic solvent (e.g., methylene chloride) is generated. On the other hand, if the temperature is too low, the amount of branching increased is small, and the flame retardancy owing to the heat treatment can be hardly brought out. Here, in the present invention, in the case of heat treatment using an extruder, the heat temperature treatment is defined as the set temperature (extrusion temperature) of the extruder.

As the heating time, the heating duration is preferably from 0.5 minutes to 4 hours, more preferably from 0.7 minutes to 3 hours, still more preferably from 1 minute to 2 hours, yet still more preferably from 1.5 minutes to 1 hour.

If the heating time is too long, the amount of branching is excessively increased, and an organic solvent-insoluble material is generated. On the other hand, if the heating time is too short, the amount of branching increased is small, and the flame retardancy owing to the heat treatment can be hardly brought out.

<Polycarbonate Resin Composition>

The above-described polycarbonate resin of the present invention can be used as a polycarbonate resin composition where other polycarbonate resins appropriate for use and, if desired, a flame retardant, a pigment, a dye, a heat stabilizer, etc. are added. Other polycarbonate resins and flame retardant are described below.

(Other Polycarbonate Resins)

Other polycarbonate resins used here are not particularly limited, but a polycarbonate resin obtained by reacting a dihydric phenol and a polycarbonate resin is preferred. The reaction method includes, for example, interfacial polymerization, solid-phase transesterification of a carbonate prepolymer, and ring-opening polymerization of a cyclic carbonate compound.

Typical examples of the dihydric phenol include hydroquinone, resorcinol, 4,4'-biphenol, 1,1-bis(4-hydroxyphenyl)ethane, 2,2-bis(4-hydroxyphenyl)propane (bisphenol A), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, 2,2-bis(3,5-dibromo-4-hydroxyphenyl)propane, bis(3,5-dibromo-4-hydroxyphenyl)sulfone, bis(4-hydroxy-3-methylphenyl)sulfide, 9,9-bis(4-hydroxyphenyl)fluorene, and 9,9-bis(4-hydroxy-3-methylphenyl)fluorene. In the polycarbonate resin of the present invention, either a homopolymer of the dihydric phenol above or a copolymer composed of two or more of those dihydric phenols may be selected.

Among others, a homopolymer of bis(4-hydroxyphenyl)alkane such as bisphenol A, and a copolymer composed of two or more dihydric phenols selected from 1,1-bis(4-hydroxyphenyl)-3,3,5-trimethylcyclohexane, bis(4-hydroxyphenyl)alkane (e.g., bisphenol A), 2,2-bis{(4-hydroxy-3-methyl)phenyl}propane, $\alpha,\alpha'$-bis(4-hydroxyphenyl)-m-diisopropylbenzene and 9,9-bis(4-hydroxy-3-methylphenyl)fluorene are preferably used, and a homopolymer of bisphenol A is more preferred.

The amount of the other polycarbonate resin used here is preferably 1 wt % or more, more preferably 5 wt % or more, still more preferably 10 wt % or more, most preferably 20 wt % or more, and is preferably 99 wt % or less, more preferably 95 wt % or less, still more preferably 90 wt % or less, most preferably 80 wt % or less.

(Flame Retardant)

The polycarbonate resin of the present invention when added with a flame retardant to make up a polycarbonate resin composition exerts more remarkable effects, enhancing the flame retardancy. The flame retardant used includes, for example, at least one member selected, from the group consisting of a sulfonic acid metal salt-based flame retardant, a halogen-containing compound-based flame retardant, a phosphorus-containing compound-based flame retardant, and a silicon-containing compound-based flame retardant. Among these, a sulfonic acid metal salt-based flame retardant is preferred.

The blending amount of the flame retardant for use in the present invention is usually 0.01 parts by weight or more, preferably 0.05 parts by weight or more, per 100 parts by weight of the polycarbonate resin. If the blending amount of the flame retardant is excessively small, the flame-retardant effect is deteriorated, and if the blending amount of the flame retardant is excessively large, the mechanical strength of the resin molded article tends to be reduced too much.

The sulfonic acid metal salt-based flame retardant includes an aliphatic sulfonic acid metal salt, an aromatic sulfonic acid metal salt, etc. The metal of such a metal salt includes, for example, Group 1 metals of the long-form periodic table, such as sodium, lithium, potassium, rubidium and cesium; magnesiums such as beryllium and magnesium; and Group 2 metals of the long-form periodic table, such as calcium, strontium and barium. One sulfonic acid metal salt may be used, or two or more sulfonic acid metal salts may be mixed and used.

The sulfonic acid metal salt includes an aromatic sulfonesulfonic acid metal salt, a perfluoroalkane-sulfonic acid metal salt, etc.

The sulfonic acid metal salt-based flame retardant is added in an amount of preferably from 0.04 to 0.3 parts by weight, more preferably from 0.05 to 0.2 parts by weight, per 100 parts by weight of the polycarbonate resin.

Specific examples of the aromatic sulfonesulfonic acid metal salt include sodium diphenylsulfone-3-sulfonate, potassium diphenylsulfone-3-sulfonate, sodium 4,4'-dibromodiphenyl-sulfone-3-sulfonate, potassium 4,4'-dibromodiphenyl-sulfone-3-sulfone, calcium 4-chloro-4'-nitrodiphenylsulfone-3-sulfonate, disodium diphenylsulfone-3,3'-disulfonate, and dipotassium diphenylsulfone-3,3'-disulfonate.

Specific examples of the perfluoroalkane-sulfonic acid metal salt include sodium perfluorobutane-sulfonate, potassium perfluorobutane-sulfonate, sodium perfluoromethylbutane-sulfonate, potassium perfluoromethylbutane-sulfonate, sodium perfluorooctane-sulfonate, potassium perfluorooctane-sulfonate, and a tetraethylammonium salt of perfluorobutane-sulfonic acid.

Specific examples of the halogen-containing compound-based flame retardant include tetrabromobisphenol A, tribromophenol, brominated aromatic triazine, a tetrabromobisphenol A epoxy oligomer, a tetrabromobisphenol A epoxy polymer, decabromodiphenyl oxide, tribromoallyl ether, a tetrabromobisphenol A carbonate oligomer, ethylenebistetrabromophthalimide, decabromodiphenylethane, brominated polystyrene, and hexabromocyclododecane.

The halogen-containing compound-based flame retardant is added in an amount of preferably from 5 to 30 parts by weight, more preferably from 10 to 25 parts by weight, per 100 parts by weight of the polycarbonate resin.

The phosphorus-containing compound-based flame retardant includes red phosphorus, a coated red phosphorus, a polyphosphate-based compound, a phosphoric acid ester-based compound, and a phosphazene-based compound. Among these, specific examples of the phosphoric acid ester compound include trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, diisopropylphenyl phosphate, tris(chloroethyl)phosphate, tris(dichloropropyl) phosphate, tris(chloropropyl)phosphate, bis(2,3-dibromopropyl)-2,3-dichloropropyl phosphate, tris(2,3-dibromopropyl)phosphate, bis(chloropropyl)monooctyl phosphate, bisphenol A bisphosphate, hydroquinone bisphosphate, resorcin bisphosphate, and trioxybenzene triphosphate.

The phosphorus-containing compound-based flame retardant is added in an amount of preferably from 3 to 25 parts by weight, more preferably from 5 to 15 parts by weight, most preferably from 10 to 12 parts by weight, per 100 parts by weight of the polycarbonate resin.

The silicon-containing compound-based flame retardant includes, for example, silicone varnish, a silicone resin where the substituent bonded to silicon atom is composed of an aromatic hydrocarbon group and an aliphatic hydrocarbon groups having a carbon number of 2 or more, a silicone compound where the main chain has a branch structure and the organic functional group contained has an aromatic group, a silicone powder where a polydiorganosiloxane polymer that may have a functional group is supported on the surface of silica powder, and an organopolysiloxane-polycarbonate copolymer.

The polycarbonate resin composition containing the polycarbonate resin of the present invention may be molded/processed by injection molding, extrusion molding, etc. and used in various fields.

<Production Method of Polycarbonate Resin>

The production method of the polycarbonate resin is described below. The polycarbonate resin is obtained by polycondensation using a dihydroxy compound and a carbonyl compound, and the production methods therefor are roughly classified into an interfacial polycondensation method (hereinafter, referred to also as "interface method") of producing a polycarbonate resin by reacting a dihydroxy compound and carbonyl chloride (hereinafter, sometimes referred to as "CDC" or "phosgene") at the interface of an organic phase and an aqueous phase, which are not arbitrarily intermixable, and a melt polycondensation method (hereinafter, referred to as "melt method") of producing a polycarbonate resin by subjecting a dihydroxy compound and a carbonyl compound to a transesterification reaction in the molten state in the presence of a transesterification reaction catalyst.

The polycarbonate resin for use in the present invention is preferably produced by the former interface method.

The interface method is described specifically below. In the description of the production method of the polycarbonate resin by this method, the polycarbonate resin is sometimes simply referred to as "polycarbonate resin".

The polycarbonate resin by the interface method is usually obtained through steps of preparing an aqueous alkali solution of a dihydroxy compound, performing an interfacial polycondensation reaction of the dihydroxy compound and phosgene in the presence of a condensation catalyst such as amine compound, and subjecting the reaction solution to neutralization, washing with water and drying. Specifically, the process for producing a polycarbonate resin by the interface method includes at least a raw material preparation step of preparing raw materials such as monomer component, an oligomerization step of performing an oligomerization reaction, a polycondensation step of performing a polycondensation reaction using the oligomer, a washing step of washing the reaction solution after the polycondensation reaction by alkaline washing, acid washing and water washing, a polycarbonate resin isolation step of preliminarily concentrating the washed reaction solution to granulate and then isolate the polycarbonate resin, and a drying step of drying the isolated polycarbonate resin particle. Respective steps are described below.

(Raw Material Preparation Step)

In the raw material preparation step, a raw material, for example, an aqueous alkali solution of a dihydroxy compound, containing a dihydroxy compound, an aqueous solution of an alkali metal compound such as sodium hydroxide (NaOH) or an aqueous solution of an alkaline earth metal compound such as magnesium hydroxide, demineralized water (DMW), and furthermore, as the case requires, a reducing agent such as hydrosulfite (HS), is prepared in a raw material tank.

(Dihydroxy Compound)

The dihydroxy compound as a raw material of the polycarbonate resin according to the present invention specifically includes the above-described dihydroxy compound represented by formula (2), etc.

(Alkali Metal Compound or Alkaline Earth Metal Compound)

As the alkali metal compound or alkaline earth metal compound, a hydroxide is usually preferred, and examples thereof include sodium hydroxide, lithium hydroxide, potassium hydroxide, magnesium hydroxide and calcium hydroxide. Among these, sodium hydroxide is more preferred.

The ratio of the alkali metal compound or alkaline earth metal compound to the dihydroxy compound is usually from 1.0 to 1.5 (equivalent ratio), preferably from 1.02 to 1.04 (equivalent ratio). If the ratio of the alkali metal compound or alkaline earth metal compound is excessively large or excessively small, this affects the terminal group of the carbonate oligomer obtained in the oligomerization step described below, as a result, the polycondensation reaction tends to become abnormal.

(Oligomerization Step)

Next, in the oligomerization step, a phosgenation reaction of the dihydroxy compound is performed in a predetermined reactor by using the aqueous alkali solution of a dihydroxy compound prepared in the raw material preparation step and phosgene (CDC), in the presence of an organic solvent such as methylene chloride ($CH_2Cl_2$).

Subsequently, a condensation catalyst such as triethylamine (TEA) and a chain stopper such as p-tert-butylphenol (pTBP) are added to the mixed solution in which phosgenation reaction of the dihydroxy compound has been performed, and an oligomerization reaction of the dihydroxy compound is performed.

After the oligomerization reaction is further allowed to proceed, the oligomerization reaction solution of the dihydroxy compound is introduced into a predetermined static separation tank to separate an organic phase containing carbonate oligomer from an aqueous phase, and the separated organic phase is supplied to a polycondensation step.

Here, the residence time in the oligomerization step after the aqueous alkali solution of a dihydroxy compound is supplied to a reactor in which a phosgenation reaction of the dihydroxy compound is performed, until the reaction solution enters a static separation tank, is usually 120 minutes or less, preferably from 30 to 60 minutes.

(Phosgene)

Phosgene for use in the oligomerization step is usually used in liquid or gas form. The preferable amount of CDC used in the oligomerization step is appropriately selected according to the reaction conditions, in particular, according to the reaction temperature and the concentration of the dihydroxy compound in the aqueous phase, and is not particularly limited. Usually, the amount of CDC used is from 1 to 2 mol, preferably from 1.05 to 1.5 mol, per mol of the dihydroxy compound. If the amount of CDC used is excessively large, unreacted CDC is increased, and the unit consumption tends to become extremely bad. Also, if the amount of CDC used is excessively small, the chloroformate group amount is lacking, and an appropriate molecular weight growth is less likely to be achieved.

(Organic Solvent)

In the oligomerization step, an organic solvent is usually used. The organic solvent includes an arbitrary inert organic solvent capable of dissolving phosgene and a reaction product such as carbonate oligomer and polycarbonate resin at the reaction temperature and reaction pressure in the oligomerization step and incompatible with water (or incapable of forming a solution with water).

Such an inert organic solvent includes, for example, an aliphatic hydrocarbon such as hexane and n-heptane; a chlorinated aliphatic hydrocarbon such as dichloromethane, chloroform, carbon tetrachloride, dichloroethane, trichloroethane, tetrachloroethane, dichloropropane and 1,2-dichloroethylene; an aromatic hydrocarbon such as benzene, toluene and xylene; a chlorinated aromatic hydrocarbon such as chlorobenzene, o-dichlorobenzene and chlorotoluene; and a substituted aromatic hydrocarbon such as nitrobenzene and acetophenone.

Among these, a chlorinated hydrocarbon such as dichloromethane or chlorobenzene is suitably used. Such an inert organic solvent may be used alone or as a mixture with another solvent.

(Condensation Catalyst)

The oligomerization reaction may be performed in the presence of a condensation catalyst. The timing of addition of the condensation catalyst is preferably after CDC is consumed. The condensation catalyst may be arbitrarily selected from many condensation catalysts employed in a two-phase interfacial condensation method. Examples thereof include trialkylamine (specifically, triethylamine), N-ethylpyrrolidone, N-ethylpiperidine, N-ethylmorpholine, N-isopropylpiperidine, and N-isopropylmorpholine. Among these, triethylamine and N-ethylpiperidine are preferred.

(Chain Stopper)

In this embodiment, a monophenol is usually used as a chain stopper in the oligomerization step. The monophenol includes, for example, phenol; an alkylphenol having a carbon number of 1 to 20, such as p-tert-butylphenol and p-cresol; and a halogenated phenol such as p-chlorophenol and 2,4,6-tribromophenol. The amount of the monophenol used is appropriately selected according to the molecular weight of the carbonate oligomer obtained and is usually from 0.5 to 10 mol % based on the dihydroxy compound.

In the interface method, the molecular weight of the polycarbonate resin is determined by the amount added of the chain stopper such as monophenol. Accordingly, from the standpoint of controlling the molecular weight of the polycarbonate resin, the timing of addition of the chain stopper is preferably between immediately after the completion of consumption of the carbonate-forming compound and before the molecular weight growth starts.

If the monophenol is added in the co-presence of the carbonate-forming compound, a large amount of a condensate (diphenyl carbonates) between a monophenol and a monophenol is produced, and a polycarbonate resin having the target molecular weight is less likely to be obtained. If the timing of addition of the monophenol is too late, the molecular weight can be hardly controlled and furthermore, a resin having a peculiar shoulder on the low molecular side in the molecular weight distribution tends to be obtained, causing a problem, for example, that sagging occurs at the time of molding.

(Branching Agent)

In the oligomerization step, an arbitrary branching agent may be used. This branching agent includes, for example, 1,1,1-tris-(4-hydroxyphenyl)ethane, 2,4-bis(4-hydroxyphenylisopropyl)phenol, 2,6-bis(2-hydroxy-5-methylbenzyl)-4-methylphenol, 2-(4-hydroxyphenyl)-2-(2,4-dihydroxyphenyl)propane, and 1,4-bis(4,4'-dihydroxytriphenylmethyl)benzene. In addition, 2,4-dihydroxybenzoic acid, trimesic acid, cyanuric chloride, etc. may also be used. Among these, a branching agent having at least three phenolic hydroxy groups is suitable. The amount of the branching agent used is appropriately selected according to the degree of branching of the carbonate oligomer obtained and usually, is preferably 0.01 mol or more, more preferably 0.02 mol or more, still more preferably 0.05 mol or more, most preferably 0.1 mol or more, and is preferably 5 mol % or less, more preferably 3 mol % or less, still more preferably 2 mol % or less, most preferably 1 mol % or less, based on the dihydroxy compound.

In the oligomerization step, in the case of employing a two-phase interfacial condensation method, it is particularly preferred that in advance of allowing the aqueous alkali metal compound solution or aqueous alkaline earth metal compound solution of a dihydroxy compound to come into contact with phosgene, an organic phase containing the dihydroxy compound and an aqueous phase containing the alkali metal compound or alkaline earth metal compound are put into contact with an organic phase incapable of arbitrarily intermixing with water to thereby form an emulsion.

As the device to form such an emulsion, for example, a mixing machine, e.g., a stirrer having a predetermined stirring blade, a dynamic mixer such as homogenizer, homomixer, colloid mill, flow jet mixer and ultrasonic emulsifier, or a static mixer, is preferably used. The emulsion usually has a droplet size of 0.01 to 10 μm and has emulsion stability.

The emulsified state of the emulsion is usually expressed by the Weber number or P/q (load power per unit volume). The Weber number is preferably 10,000 or more, more preferably 20,000 or more, most preferably 35,000 or more. As the upper limit, a level of about 1,000,000 or less is enough. Also, P/q is preferably 200 kg·m/L or more, more preferably 500 kg·m/L or more, most preferably 1,000 kg·m/L or more.

From the standpoint of suppressing dissolution of CDC in the organic phase, the contact of the emulsion with CDC is preferably performed under milder mixing conditions than the above-described emulsification conditions. The Weber number is less than 10,000, preferably less than 5,000, more preferably less than 2,000. Also, P/q is less than 200 kg·m/L, preferably less than 100 kg·m/L, more preferably less than 50 kg·m/L. The contact with CDC can be achieved by introducing CDC into a tubular reactor or a tank-type reactor.

The reaction temperature in the oligomerization step is usually 80° C. or less, preferably 60° C. or less, more preferably from 10 to 50° C. The reaction time is appropriately selected according to the reaction temperature and is usually from 0.5 minutes to 10 hours, preferably from 1 minute to 2 hours. If the reaction temperature is excessively high, a side reaction cannot be controlled, and the CDC unit consumption tends to be deteriorated. If the reaction temperature is excessively low, although this is preferred in view of reaction control, the refrigeration load is likely to increase, leading to a rise in the cost.

The carbonate oligomer concentration in the organic phase may be sufficient if it is in such a range that the obtained carbonate oligomer is soluble, and specifically, the concentration is approximately from 10 to 40 wt %. The proportion of the organic phase is preferably from 0.2 to 1.0 in terms of volume ratio to the aqueous phase containing the aqueous alkali metal salt solution or aqueous alkaline earth metal salt solution of the dihydroxy compound.

(Polycondensation Step)

Next, in the polycondensation step, the carbonate oligomer-containing organic phase separated from the aqueous phase in the static separation tank is transferred to an oligomer storage tank having a stirrer. In the oligomer storage tank, a condensation catalyst such as triethylamine (TEA) is further added.

Subsequently, the organic phase stirred in the oligomer storage tank is introduced into a predetermined polycondensation reaction tank. Furthermore, demineralized water (DMW), an organic solvent such as methylene chloride ($CH_2Cl_2$), an aqueous sodium hydroxide solution, etc. are supplied to the polycondensation reaction tank, then stirred and mixed to perform a polycondensation reaction of the carbonate oligomer.

The polycondensation reaction solution in the polycondensation reaction tank is thereafter continuously introduced in sequence to a plurality of polycondensation reaction tanks to complete the polycondensation reaction of the carbonate oligomer.

Here, in the polycondensation step, the residence time in the polycondensation reaction tank in which the polycondensation reaction of the carbonate oligomer is continuously performed, is usually 12 hours or less, preferably from 0.5 to 5 hours.

In a preferred embodiment of the polycondensation step, first, the organic phase containing the carbonate oligomer and the aqueous phase are separated, and, if desired, the carbonate oligomer concentration is adjusted by adding an inert organic solvent to the organic phase separated. In this case, the amount of the inert organic solvent is adjusted such that the concentration of the polycarbonate resin in the organic phase obtained by the polycondensation reaction becomes from 5 to 30 wt %. Next, water and an aqueous solution containing an alkali metal compound or an alkaline earth metal compound are newly added. Furthermore, a condensation catalyst is preferably added so as to regulate the polycondensation conditions, and the polycondensation reaction is performed in accordance with the interfacial polycondensation method. The ratio of the organic phase to the aqueous phase in the polycondensation reaction is preferably, in terms of volume ratio, organic phase:aqueous phase=approximately from 1:0.2 to 1:1.

The alkali metal compound or alkaline earth metal compound includes the same compounds as those used in the above-described oligomerization step. Among others, sodium hydroxide is industrially preferred. The amount of the alkali metal compound or alkaline earth metal compound used may be sufficient if it is not less than the amount with which the reaction system is always kept alkaline during the polycondensation reaction, and such a compound may be added in an entire amount all at once when starting the polycondensation reaction, or the compound may be added appropriately in parts during the polycondensation reaction.

If the amount of the alkali metal compound or alkaline earth metal compound used is excessively large, a hydrolysis reaction as a side reaction tends to proceed. Therefore, it is preferable to adjust the amount used such that the concentration of the alkali metal compound or alkaline earth metal compound contained in the aqueous phase after the completion of polycondensation reaction becomes 0.05 N or more, preferably approximately from 0.05 to 0.3 N.

The polycondensation reaction temperature in the polycondensation step is usually near room temperature. The reaction time is from 0.5 to 5 hours, preferably approximately from 1 to 3 hours.

(Washing Step)

After the completion of the polycondensation reaction in the polycondensation reaction tank, the polycondensation reaction solution is subjected to alkali washing with an alkaline wash solution, acid washing with an acid wash solution, and water washing with wash water by a known method. Incidentally, the total residence time in the washing step is usually 12 hours or less, preferably from 0.5 to 6 hours.

(Polycarbonate Resin Isolation Step)

In the polycarbonate resin isolation step, first, the polycarbonate resin-containing polycondensation reaction solution washed in the washing step is concentrated to a predetermined solid content concentration to prepare a concentrated solution. The solid content concentration of the polycarbonate resin in the concentrated solution is usually from 5 to 35 wt %, preferably from 10 to 30 wt %.

Next, the concentrated solution is continuously supplied to a predetermined granulation tank, then stirred and mixed with demineralized water (DMW) at a predetermined temperature, and a granulation treatment of evaporating the organic solvent while maintaining the suspended state in water is performed to make a water slurry containing a granular polycarbonate resin.

Here, the temperature of demineralized water (DMW) is usually from 37 to 67° C., preferably from 40 to 50° C. Also, the solidification temperature of the polycarbonate resin by the granulation treatment performed in the granulation tank is usually from 37 to 67° C., preferably from 40 to 50° C.

The water slurry containing a polycarbonate resin powder continuously discharged from the granulation tank is then continuously introduced into a predetermined separator, and water is separated from the water slurry.

(Drying Step)

In the drying step, the polycarbonate resin powder after the separation of water from the water slurry in the separator is continuously supplied to a predetermined dryer, allowed to stay for a predetermined residence time and then continuously withdrawn. The dryer includes, for example, a fluidized bed dryer. Incidentally, the drying treatment may be performed continuously by connecting a plurality of fluidized bed dryers in series.

Here, the dryer usually has a heating device such as heat medium jacket and is held at usually from 0.1 to 1.0 MPa·G, preferably from 0.2 to 0.6 MPa·G, for example, by means of water vapor, and the temperature of nitrogen ($N_2$) flowing in the dryer is thereby kept at usually from 100 to 200° C., preferably from 120 to 180° C.

<Production Method of Polycarbonate Resin by Heat Treatment>

The polycarbonate resin obtained above is used as the polycarbonate resin (A) and heat-treated, whereby the amount of the compound represented by formula (3) can be increased to make up the polycarbonate resin of the present invention.

The method for heat treatment may be any method, but the treatment can be suitably performed using a twin-screw extruder having a vent hole (e.g., twin-screw extruder (LABOTEX30HSS-32) manufactured by The Japan Steel Works, Ltd.) by subjecting the resin to melt kneading, extrusion into a strand form from the twin-screw extruder outlet, cooling/solidification with water, and then pelletization by a rotary cutter. At this time, the polycarbonate resin temperature at the twin-screw extruder outlet is set to be from 200 to 400° C., preferably from 260 to 380° C., more preferably from 270 to 360° C., still more preferably from 280 to 350° C., by adjusting the barrel temperature of the twin-screw extruder. Incidentally, during the melt kneading, the vent hole of the twin-screw extruder is connected to a vacuum pump and controlled such that the pressure becomes about 500 Pa at the vent hole. In addition, the resin may be placed in a tank such as reaction tank and heated at a high temperature. The temperature here is set to be preferably from 200 to 400° C., more preferably from 260 to 380° C., more preferably from 270 to 360° C., still more preferably from 280 to 350° C. The resin may be stirred, if desired.

<Production Method of Polycarbonate Resin Composition>

The method for producing the polycarbonate resin composition of the present invention is not particularly limited and includes, for example, 1) a method of melt-kneading the polycarbonate resin and other polycarbonate resins by using a mixing apparatus such as kneader, twin-screw extruder and single-screw extruder;

2) a method of melt-kneading the polycarbonate resin and other polycarbonate resins, which are in a molten state, by using a stirring tank or a mixing apparatus such as static mixer, kneader, twin-screw extruder and single-screw extruder;

3) a method of mixing the polycarbonate resin and other polycarbonate resins in a solution state by using a solvent such as dichloromethane or chlorobenzene; and 4) a method of dry blending the polycarbonate resin and other polycarbonate resins by using a tumbler, a super mixer, a Henschel mixer, a Nauta mixer, etc.

Incidentally, at the time of producing the above-described resin composition, a flame retardant, a pigment, a dye, a heat stabilizer and the like may be added, if desired.

<Production Method of Molded Article>

For producing a resin molded article from the polycarbonate resin or polycarbonate resin composition of the present invention (hereinafter, simply referred to as "polycarbonate resin composition"), an extrusion molding machine/an injection molding machine are usually used.

The temperature of such molding is not particularly specified but is preferably 200° C. or more, more preferably 250° C. or more, most preferably 280° C. or more, and is preferably 350° C. or less, more preferably 320° C. or less. If the molding temperature is too low, the moldability may be reduced due to increased melt viscosity and decreased flowability, and the effect of enhancing the surface hardness may be deteriorated, causing reduction in the surface hardness of the resin obtained. An excessively high molding temperature is not preferred, because the polycarbonate resin may be colored and the color tone of the polycarbonate resin composition may be deteriorated.

<Production Method of Injection Molded Article>

For producing an injection molded article from the polycarbonate resin composition of the present invention, a normal injection molding machine is used.

In the case of using an injection molding machine or the like, the temperature of the mold is not particularly limited but is preferably 150° C. or less, more preferably 120° C. or less, most preferably 100° C. or less, and is preferably 30° C. or more, more preferably 50° C. or more. If the temperature of the mold is too high, the cooling time at the time of molding must be set long, and the production cycle of a molded article may become long, resulting in reduction in productivity. If the temperature of the mold is too low, the melt viscosity of the resin rises excessively, leaving the possibility that a uniform molded article cannot be obtained, and a problem such as occurrence of unevenness on the molded article surface may be disadvantageously caused.

<Production Method of Extrusion Molded Article>

For producing an extrusion molded article from the polycarbonate resin composition of the present invention, an extrusion molding machine is usually used. In general, the extrusion molding machine is attached with a T-die, a cylindrical die, etc., and extrusion molded articles of various shapes can be obtained. The extrusion molded article obtained includes, for example, a sheet, a film, a plate, a tube, and a pipe. Among these, a sheet or a film is preferred.

In order to improve the adhesiveness, coatability and printability of the extrusion molded article of the polycarbonate, resin composition of the present invention, a hardcoat layer may be stacked on both surfaces or one surface of the extrusion molded article, a weather resistance and/or scratch resistance-improving film may be heat laminated on both surfaces or one surface of the extrusion molded article, or a treatment such as surface texturing or semi-transparent and opaque processing may be applied.

In addition, at the time of performing injection molding or extrusion molding, a pigment, a dye, a release agent, a heat stabilizer, etc., including the above-described flame retardant, may be further appropriately added as long as the object of the present invention is not impaired.

The above-described molded article can be used in various fields of building, vehicle, electric/electronic device, machine and others.

Example

The present invention is described in greater detail below by referring to Examples, but the present invention should not be construed as being limited to the following Examples. The physical properties of the polycarbonate resin and composition used in Examples were evaluated by the following methods.

[Evaluation Method]
(1) Pencil Hardness

A polycarbonate resin plate (molded article) of 3 mm in thickness, 60 mm in height and 60 mm in width was injection molded using an injection molding machine ("J50E2", manufactured by The Japan Steel Works, Ltd.) under the conditions of a barrel temperature of 280° C. and a mold temperature of 90° C. This molded article was measured for the pencil hardness under a load of 750 g by using a pencil hardness tester (manufactured by Toyo Seiki Seisaku-sho, Ltd.) in conformity with ISO15184 to determine the pencil hardness.

(2) Viscosity Average Molecular Weight (Mv)

The polycarbonate resin was dissolved in methylene chloride (concentration: 6.0 g/L) and after measuring the specific viscosity ($\eta sp$) at 20° C. by using an Ubbelohde viscosity tube, the viscosity average molecular weight (Mv) was calculated in accordance with the following formula.

$$\eta sp/C = [\eta](1+0.28\eta sp)$$

$$[\eta] = 1.23 \times 10^{-4} Mv^{0.83}$$

(3) Quantification of Compound Represented by Formula (2), (3) or (4)

After dissolving 0.5 g of the polycarbonate resin in 5 ml of methylene chloride, 45 ml of methanol and 5 ml of an aqueous 25 wt % sodium hydroxide solution were added, followed by stirring at 70° C. for 30 minutes. The obtained solution was analyzed by liquid chromatography, and the compounds represented by formulae (2) to (4) were quantitatively determined. Here, the quantification was performed using a calibration curve prepared by quantitatively determining the compound (compound (1)) represented by formula (2).

Incidentally, in the compound represented by formula (2), (3) or (4) derived from a polycarbonate resin (BPC homopolymer), X is an isopropylidene group, $R^1$, $R^2$ and $R^3$ are a methyl group, and $R^4$ is a hydrogen atom.

3-1) Liquid Chromatography Measurement:

The liquid chromatography measurement was performed by the following method.

Apparatus: manufactured by Shimadzu Corporation
System controller: CBM-20A
Pump: LC-10AD
Column oven: CTO-10ASvp
Detector: SPD-M20A
Analysis column: YMC-Pack ODS-AM 75 mm×φ4.6 mm
Oven temperature: 40° C.
Detection wavelength: 280 nm
Eluent:
  Solution A: aqueous 0.1% trifluoroacetic acid solution,
  Solution B:
acetonitrile, gradient for 25 minutes from A/B=60/40 (vol %) to A/B=95/5 (vol %).
Flow rate: 1 mL/min
Sample injection amount: 20 μL Also, the compound 2 represented by formula (4) and the compound 3 represented by formula (3) were observed at the following retention time under the above-described liquid chromatography conditions.

3-2) Retention Time

Compound 2 represented by formula (4): 15.9 minutes
Compound 3 represented by formula (3): 21 minutes Identification of each compound was performed by dispensing the portion corresponding to the peak observed at the retention time above and measuring the dispensed sample for $^1$H-NMR, $^{13}$C-NMR, two-dimensional NMR, mass spectrometry (MS) and infrared absorption spectrum (IR spectrum).

3-3) Identification of Compound

The compound 2 represented by formula (4) was identified from the molecular weight by mass spectrometry of the dispensed sample above and the signal in each NMR spectrum as well as the signal derived from carboxylic acid observed in IR spectrum. The compound 3 represented by formula (3) was identified from the molecular weight by mass spectrometry of the dispensed sample and the signal in each NMR spectrum.

3-4) Amount of Branching of BPA Homopolymer:

As for the BPA homopolymer, liquid chromatography measurement was performed by the same procedure as above, and the amount of branching was calculated from the area values of peaks observed at the following retention time.

Retention time: 11.6 minutes, 15.1 minutes, 16.5 minutes, 18.6 minutes, and 20.6 minutes.

(4) V-0 Achieving Thickness of Injection Molded Body at the Time of Addition of Flame Retardant The polycarbonate resin was kneaded in a twin-screw extruder ("TEX30XCT", manufactured by The Japan Steel Works, Ltd.) at a barrel temperature of 280° C. to obtain a polycarbonate resin composition pellet. At the time of kneading, 0.1 wt % of potassium perfluorobutanesulfonate ("Bayowet C4", produced by Bayer) as a flame retardant, and 0.1 wt % of pentaerythritol tetrastearate ("UNISTER H-476", produced by NOF Corporation) as a release agent were added. The pellet obtained was dried at 80° C. for 5 hours and injection-molded by changing the thickness in conformity with UL Standard by an injection molding machine ("SE100DU", manufactured by Sumitomo Heavy Industries, Ltd.) under the conditions of a cylinder temperature of 260 to 280° C. and a molding cycle of 30 seconds to obtain a test piece, and a vertical combustion test of UL Standard 94 was performed.

(5) Terminal Hydroxyl Group Concentration

After dissolving 0.1 g of the polycarbonate resin composition in 10 ml of methylene chloride, 5 ml of a 5% methylene chloride solution of acetic acid (guaranteed reagent, Wako Pure Chemical Industries, Ltd.) and 10 ml of a 2.5% methylene chloride solution of titanium tetrachloride (guaranteed reagent, Wako Pure Chemical Industries, Ltd.) were added thereto to develop color, and the absorbance at a wavelength of 546 nm was measured using a spectrophotometer ("Model UV160", manufactured by Shimadzu Corporation). Separately, the extinction coefficient was determined using a methylene chloride solution of dihydric phenol used at the time of production of the polycarbonate resin composition, and the terminal hydroxyl group concentration in the sample was quantitatively determined.

(6) Phenol Compound Content in Polycarbonate Resin (Phenol Compound Content in PC)

1.2 g of the polycarbonate resin was dissolved in 25 ml of acetone, and the supernatant liquid was measured by liquid chromatography ("LC-10AT", manufactured by Shimadzu Corporation, column: "MCI GEL ODS" (5 μm), 4.6 mm ID×150 mm L, detector: UV219 nm, eluent: acetonitrile/water=4/6 by volume) to quantitatively determine the residual film amount, residual biphenol A amount, residual bisphenol C amount and residual p-tert-butylphenol amount in the polycarbonate resin.

The phenol compound content is the total of the phenol content in PC, BPA content in PC, and BPC content in PC.

(7) Chlorine Atom Content in Polycarbonate Resin (Chlorine Atom Content in PC)

The chlorine atom content in the polycarbonate resin was quantitatively determined using a combustion absorption coulometric titration method ("TOX-100", manufactured by Mitsubishi Chemical Corporation).

(8) Film Foreign Matter (Number of Foreign Matters)

The polycarbonate resin was formed into a film by a single-screw extruder having a 180 mm-wide die and a film take-off device which are attached to the end, at a barrel temperature of 280° C. to obtain a 70-μm polycarbonate film. With respect to this polycarbonate film, the number of foreign matters of 50 μm or more was counted with an eye or by using a microscope and evaluated as the number of pieces per m$^2$.

(9) Color Tone (YI)

The polycarbonate resin was molded into a polycarbonate resin molded product of 3 mm in thickness, 60 mm in height and 60 mm in width by an injection molding machine ("J50E2", manufactured by The Japan Steel Works, Ltd.) under the conditions of a barrel temperature of 280° C. and a mold temperature of 90° C. This polycarbonate resin molded body was measured for the yellow index (YI) by a spectrophotometer (CM-3700d, manufactured by Minolta Inc.). A smaller numerical value indicates a better color tone.

(10) Heat Residence Molding Test

Using an injection molding machine (product name: "JSW J75EII", manufactured by The Japan Steel Works, Ltd.), the polycarbonate resin was plasticized at 320° C. and then made to stay in the cylinder for 180 seconds, whereby a 60 mm-square molded piece having a thickness of 3.2 mm was molded. With respect to this molded piece, the compound represented by formula (2), (3) or (4) was quantitatively determined in the same manner as in Evaluation Method (3) ("Quantification of Compound Represented by Formula (2), (3) or (4)") above.

In the present invention, the largest thickness above which V-0 is not achieved at the time of evaluating test pieces having a thickness of 3 mm, 2 mm, 1.8 mm, 1.5 mm, 1.2 mm, 1.0 mm and 0.8 mm of each polycarbonate resin composition, was defined as V-0 Achieving Thickness. Incidentally, a smaller V-0 achieving thickness indicates a higher flame retardancy at small thickness.

The polycarbonate resins used in Examples and Comparative Examples are as follows.

(1) Polycarbonate Resin:

1) PC(a1): 2,2-bis(4-hydroxy-3-methylphenyl)propane ("BPC"); homopolymer (interface method)

After 13.80 kg/hour of BPC (produced by Honshu Chemical Industry Co., Ltd.), 5.8 kg/hour of sodium hydroxide (NaOH) and 93.5 kg/hour of water were dissolved at 35° C. in the presence of 0.017 kg/hour of hydrosulfite, each of the aqueous phase cooled to 25° C. and the organic phase at 61.9 kg/hour of methylene chloride cooled to 5° C. were supplied to a fluororesin-made pipe having an inner diameter of 6 mm and an outer diameter of 8 mm and put into contact with 7.2 kg/hour of separately introduced liquefied phosgene cooled to 0° C. in a fluororesin-made pipe reactor having an inner diameter of 6 mm and a length of 34 m and being connected to the pipe above.

The above-described raw material was allowed to undergo phosgenation and oligomerization reactions in the course of flowing together with phosgene in the pipe reactor at a linear velocity of 1.7 m/sec for 20 seconds. At this time, the reaction temperature reached an overhead temperature of 60° C. in an adiabatic system. The temperature of the reaction product was adjusted to 35° C. by external cooling before entering the next oligomerization tank.

At the time of oligomerization, 5 g/hour ($0.9 \times 10^{-3}$ mol per mol of BPC) of triethylamine as a catalyst and 0.153 kg/hour of p-tert-butylphenol as a molecular weight adjusting agent were used, and each of these compounds was introduced into the oligomerization tank.

The oligomerized emulsion obtained as above in a pipe reactor was further introduced into a stirrer-attached reaction tank having an internal volume of 50 liter and stirred at 30° C. in a nitrogen gas ($N_2$) atmosphere to cause oligomerization and thereby consume unreacted BPC sodium salt (BPC-Na) existing in the aqueous phase, and thereafter, the aqueous phase and the oil phase were statically separated to obtain a methylene chloride solution of an oligomer.

Out of the methylene chloride solution of an oligomer, 23 kg was charged into a Pfaudler blade-attached reaction tank having an internal volume of 70 L, 10 kg of methylene chloride for dilution was added thereto, 2.2 kg of an aqueous 25 mass % sodium hydroxide solution, 6 kg of water and 2.2 g of triethylamine ($1.1 \times 10^{-3}$ mol per mol of BPC) were further added, and a polycondensation reaction was performed for 60 minutes with stirring at 30° C. in a nitrogen gas atmosphere to obtain a polycarbonate resin.

Subsequently, 30 kg of methylene chloride and 7 kg of water were added and after stirring for 20 minutes, the stirring was stopped to separate the aqueous phase and the organic phase. In addition, 20 kg of 0.1 N hydrochloric acid was added to the separated organic phase and stirred for 15 minutes and after extracting triethylamine and a slight amount of remaining alkali component, the stirring was stopped to separate the aqueous phase and the organic phase.

Furthermore, 20 kg of pure water was added to the separated organic phase and after stirring for 15 minutes, the stirring was stopped to separate the aqueous phase and the organic phase. This operation was repeated (three times) until chlorine ion was not detected in the discharged water after extraction. The resulting purified organic phase was fed to warm water at 40° C., thereby effecting powdering, and then dried to obtain a flaked polycarbonate resin powder.

The viscosity average molecular weight of PC(a1) was 30,000. Also, the pencil hardness was 2H.

2) PC(b1): Homopolymer (Melt Method)

A commercially available polycarbonate resin composed of only a monomer unit derived from BPA and produced by the melt method (M7022J, produced by Mitsubishi Engineering-Plastics Corporation) was used as PC(b1). The viscosity average molecular weight of PC(b1) was 25,600. Also, the pencil hardness was 2B.

3) PC(b2): BPA Homopolymer (Interface Method)

A commercially available polycarbonate resin composed of only a monomer unit derived from BPA and produced by the interface method (E-2000, produced by Mitsubishi Engineering-Plastics Corporation) was used as PC(b2). The viscosity average molecular weight of PC(b2) was 22,000. Also, the pencil hardness was 2B.

4) Synthesis of PC(a2-1): Synthesis of BPC Homopolymer (Melt Method)

An aqueous solution of cesium carbonate was added to 37.60 kg (about 147 mol) of BPC (produced by Honshu Chemical Industry Co., Ltd.) and 32.20 kg (about 150 mol) of diphenyl carbonate (DPC) to have a cesium carbonate content of 2 μmol per mol of the dihydroxy compound, whereby a mixture was prepared. This mixture was then charged into a first reactor having an internal volume of 200 L and being equipped with a stirrer, a heat medium jacket, a vacuum pump and a reflux condenser.

Thereafter, an operation of depressurizing the inside of the first reactor to 1.33 kPa (10 Torr) and then restoring it to atmospheric pressure with nitrogen was repeated 5 times, thereby nitrogen-purging the inside of the first reactor. After the nitrogen purging, the mixture was dissolved by passing a heat medium at a temperature of 230° C. to the heat medium jacket and thereby gradually raising the internal temperature of the first reactor. Thereafter, the stirrer was rotated at 55 rpm, and the internal temperature of the first reactor was kept at 220° C. by controlling the temperature in the heat medium jacket. Then, the pressure in the first reactor was reduced over 40 minutes from 101.3 kPa (760 Torr) to 13.3 kPa (100 torr) in terms of absolute pressure while distilling off by-product phenol produced by the oligomerization reaction of BPC and DPC occurring in the first reactor.

Subsequently, a transesterification reaction was performed for 80 minutes while keeping the pressure in the first reactor at 13.3 kPa and further distilling off phenol.

Thereafter, the pressure inside the system was restored with nitrogen to 101.3 kPa in terms of absolute pressure and raised to 0.2 MPa in terms of gauge pressure, and the oligomer in the first reactor was pressure-fed to a second reactor through a transfer pipe heated to 200° C. or more in advance. Here, the second reactor has an internal volume of 200 L and is equipped with a stirrer, a heat medium jacket, a vacuum pump and a reflux condenser, where the internal pressure and the internal temperature were controlled to atmospheric pressure and 240° C., respectively.

The oligomer pressure-fed to the second reactor was then stirred at 16 rpm, the internal temperature was raised by the heat medium jacket, and the pressure in the second reactor was reduced over 40 minutes from 101.3 kPa to 13.3 kPa in terms of absolute pressure. Thereafter, the temperature rise was continued, the internal pressure was further reduced over 40 minutes from 13.3 kPa to 399 Pa (3 Ton) in terms of absolute pressure, and the distilled-off phenol was removed to the outside of the system. Furthermore, the temperature rise was continued and after the absolute pressure in the second reactor reached 70 Pa (about 0.5 Ton), the polycondensation reaction was performed by keeping 70 Pa. The final internal temperature in the second reactor was 285° C. When the stirrer of the second reactor reached a previously determined or given stirring power, the polycondensation reaction was terminated.

Subsequently, the pressure in the second reactor was restored with nitrogen to 101.3 kPa in terms of absolute pressure and then raised to 0.2 MPa in terms of gauge pressure, and from the bottom of the second reactor, the polycarbonate resin was withdrawn in a strand form and pelletized using a rotary cutter under cooling in a water bath to obtain Polycarbonate Resin (PC(a2-1)). The viscosity average molecular weight of Polycarbonate Resin (PC(a2-1)) was 33,200. Also, the pencil hardness was 2H.

[Example 1]

PC(a1) was melt-kneaded by a twin-screw extruder (LABOTEX30HSS-32) manufactured by The Japan Steel Works, Ltd. having one vent hole under the conditions shown in Table 1, extruded in a strand form from the twin-screw extruder outlet, cooled/solidified with water, and pelletized by a rotary cutter to obtain a polycarbonate resin pellet. At this time, the barrel temperature of the twin-screw extruder was 330° C., and the polycarbonate resin temperature at the twin-screw extruder outlet was 367° C. Incidentally, during melt-kneading, the vent hole of the twin-screw extruder was connected to a vacuum pump, and the pressure was controlled to become 500 Pa at the vent hole.

This polycarbonate resin was subjected to various evaluations according to the above-described procedures. The results are shown in Table 1.

[Example 2]

PC(a1) was melt-kneaded by a twin-screw extruder (LABOTEX30HSS-32) manufactured by The Japan Steel Works, Ltd. having one vent hole under the conditions shown in Table 1, extruded in a strand form from the twin-screw extruder outlet, cooled/solidified with water, and pelletized by a rotary cutter to obtain a polycarbonate resin pellet. At this time, the barrel temperature of the twin-screw extruder was 300° C., and the polycarbonate resin temperature at the twin-screw extruder outlet was 330° C. Incidentally, during melt-kneading, the vent hole of the twin-screw extruder was connected to a vacuum pump, and the pressure was controlled to become 500 Pa at the vent hole.

This polycarbonate resin was subjected to various evaluations according to the above-described procedures. The results are shown in Table 1.

[Example 3]

PC(a1) was melt-kneaded by a twin-screw extruder (LABOTEX30HSS-32) manufactured by The Japan Steel Works, Ltd. having one vent hole under the conditions shown in Table 1, extruded in a strand form from the twin-screw extruder outlet, cooled/solidified with water, and pelletized by a rotary cutter to obtain a polycarbonate resin pellet. At this time, the barrel temperature of the twin-screw extruder was 270° C., and the polycarbonate resin temperature at the twin-screw extruder outlet was 320° C. Incidentally, during melt-kneading, the vent hole of the twin-screw extruder was connected to a vacuum pump, and the pressure was controlled to become 500 Pa at the vent hole.

This polycarbonate resin was subjected to various evaluations according to the above-described procedures. The results are shown in Table 1.

[Comparative Example 1]

PC(a1) was directly subjected to various evaluations according to the above-described procedures. The results are shown in Table 1.

[Comparative Example 2]

PC(a1) was melt-kneaded by a twin-screw extruder (LABOTEX30HSS-32) manufactured by The Japan Steel Works, Ltd. having one vent hole under the conditions shown in Table 1, extruded in a strand form from the twin-screw extruder outlet, cooled/solidified with water, and pelletized by a rotary cutter to obtain a polycarbonate resin pellet. At this time, the barrel temperature of the twin-screw extruder was 270° C., and the polycarbonate resin temperature at the twin-screw extruder outlet was 303° C. Incidentally, during melt-kneading, the vent hole of the twin-screw extruder was connected to a vacuum pump, and the pressure was controlled to become 500 Pa at the vent hole.

This polycarbonate resin was subjected to various evaluations according to the above-described procedures. The results are shown in Table 1.

[Comparative Example 3]

PC(b1) was directly subjected to various evaluations according to the above-described procedures. The results are shown in Table 1.

[Comparative Example 4]

PC(b1) was melt-kneaded by a twin-screw extruder (LABOTEX30HSS-32) manufactured by The Japan Steel Works, Ltd. having one vent hole under the conditions shown in Table 1, extruded in a strand form from the twin-screw extruder outlet, cooled/solidified with water, and pelletized by a rotary cutter to obtain a polycarbonate resin pellet. At this time, the barrel temperature of the twin-screw extruder was 330° C. Incidentally, during melt-kneading, the vent hole of the twin-screw extruder was connected to a vacuum pump, and the pressure was controlled to become 500 Pa at the vent hole.

This polycarbonate resin was subjected to various evaluations according to the above-described procedures. The results are shown in Table 1.

[Comparative Example 5]

PC(a2-1) was directly subjected to various evaluations according to the above-described procedures. The results are shown in Table 1.

[Comparative Example 6]

PC(a2-1) was melt-kneaded by a twin-screw extruder (LABOTEX30HSS-32) manufactured by The Japan Steel Works, Ltd. having one vent hole under the conditions shown in Table 1, extruded in a strand form from the twin-screw extruder outlet, cooled/solidified with water, and pelletized by a rotary cutter to obtain a polycarbonate resin pellet. At this time, the barrel temperature of the twin-screw extruder was 330° C., and the polycarbonate resin temperature at the twin-screw extruder outlet was 354° C. Incidentally, during melt-kneading, the vent hole of the twin-screw extruder was connected to a vacuum pump, and the pressure was controlled to become 500 Pa at the vent hole.

This polycarbonate resin was subjected to various evaluations according to the above-described procedures. The results are shown in Table 1.

[Comparative Example 7]

PC(a1) was melt-kneaded by a twin-screw extruder (LABOTEX30HSS-32) manufactured by The Japan Steel Works, Ltd. having one vent hole under the conditions shown in Table 1, extruded in a strand form from the twin-screw extruder outlet, cooled/solidified with water, and pelletized by a rotary cutter to obtain a polycarbonate resin pellet. At this time, the barrel temperature of the twin-screw extruder was 330° C., and the polycarbonate resin temperature at the twin-screw extruder outlet was 348° C. Incidentally, during melt-kneading, the vent hole of the twin-screw extruder was connected to a vacuum pump, and the pressure was controlled to become 500 Pa at the vent hole.

This polycarbonate resin was subjected to various evaluations according to the above-described procedures. The results are shown in Table 1.

[Comparative Example 8]

PC(a2-1) (viscosity average molecular weight: 33,200) was placed in a glass vessel and heated for 5 hours at 1 kPa by adjusting the set temperature of the electric heater to 340° C.

This polycarbonate resin was subjected to various evaluations according to the above-described procedures. The results are shown in Table 1. Also, when the resin was dissolved in methylene chloride, insoluble matters were generated.

TABLE 1

| | | Unit | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|
| | Polymer | | BPC-PC | BPC-PC | BPC-PC | BPC-PC | BPC-PC | BPC-PC | BPC-PC | BPC-PC | BPC-PC | BPC-PC | BPC-PC |
| | Production method | | Interface Method | Interface Method | Interface Method | Interface Method | Interface Method | Melt Method | Melt Method | Melt Method | Melt Method | Interface Method | Melt Method |
| Product before heating | Mv | | 30000 | 30000 | 30000 | 30000 | 30000 | 25600 | 25600 | 33200 | 33200 | 30000 | 33200 |
| | formula (3) + formula (4) | ppm | not detected | not detected | not detected | not detected | not detected | 1500 | 1500 | 3400 | 3400 | not detected | 3400 |
| Heating conditions (extraction) | Barrel set temperature (inlet) | ° C. | 100 | 100 | 100 | — | 100 | — | 100 | — | 100 | 100 | — |
| | Barrel set temperature (outlet) | ° C. | 330 | 300 | 270 | — | 270 | — | 330 | — | 330 | 330 | — |
| | Resin outlet temperature | ° C. | 367 | 330 | 320 | — | 303 | — | — | — | 354 | 348 | — |
| | Rotation speed of screw | rpm | 200 | 200 | 200 | — | 100 | — | 200 | — | 200 | 200 | — |
| | Amount of resin supplied | kg/hr | 10 | 10 | 10 | — | 10 | — | 10 | — | 5 | 5 | — |
| | Residence time | min | 4 | 4 | 4 | — | 4 | — | 4 | — | 8 | 8 | — |
| | Formula (4) | ppm | 30 | 7 | 9 | not detected | 5 | 1500 | — | 120 | 250 | 45 | 6000 |
| | Formula (3) | ppm | 4870 | 1720 | 650 | not detected | 480 | not detected | — | 3180 | 8900 | 7600 | 48000 |
| | Formulae (3) + (4) | ppm | 4900 | 1727 | 659 | not detected | 485 | 1500 | — | 3400 | 9150 | 7645 | 54000 |
| | Terminal hydroxyl group concentration | ppm | 140 | 140 | 140 | 140 | 140 | 480 | 480 | 800 | 800 | 140 | 800 |
| | Phenol concentration in polymer | ppm | not detected | not detected | not detected | not detected | not detected | 13 | 10 | 101 | 76 | not detected | — |
| | BPA concentration in polymer | ppm | not detected | not detected | not detected | not detected | not detected | 34 | 38 | not detected | not detected | not detected | — |

TABLE 1-continued

|  | Unit | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|
| BPC concentration in polymer | ppm | 33 | 32 | 34 | 41 | 34 | not detected | not detected | 55 | 65 | 36 | — |
| Chlorine atom content | ppm | not detected | not detected | not detected | 11 | 2 | not detected | not detected | not detected | not detected | not detected | — |
| Flame retardancy test | V-0 Achieving thickness | mm | 1.2 | — | 1.8 | 2 | 2 | 2 | 2 | 1.2 | 1.2 | 1.2 | — |
| Color tone | YI | 13 | 11 | 12 | — | 11 | 14 | 16 | 15 | — | 25 | — |
| Film foreign matter | Number of foreign matters | pieces | 2400 | 1850 | 1440 | 2240 | 1560 | — | — | 4350 | 8530 | 7820 | — |
| Heat residence | Increment of formula (4) | ppm | 10 | — | — | — | — | — | — | 12 | — | — | — |
| molding test (320° C.) | Increment of formula (3) | ppm | 620 | — | — | — | — | — | — | 1110 | — | — | — |

In Comparative Example 1 where PC(a1) was used as it is, the content of the compound represented by formula (3) was small and the V-0 thickness was 2 mm. On the other hand, in Examples 1 to 3, the V-0 thickness of PC(a1) as a BPC homopolymer was 1.2 mm and smaller than in Comparative Example 1, revealing that the flame retardancy was enhanced.

Also, in Comparative Example 3 where PC(b1) as a BPA homopolymer was used as it is, the V-0 thickness was 2 mm. In Comparative Example 4 where PC(b1) as a BPA homopolymer was heated under the same conditions as in Example 1 and used, the V-0 thickness was 2 mm.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2012-081759) filed on Mar. 30, 2012, and Japanese Patent Application (Patent Application No. 2012-081760) filed on Mar. 30, 2012, the contents of which are incorporated herein by way of reference.

INDUSTRIAL APPLICABILITY

According to the present invention, the flame retardancy can be simply and easily enhanced without impairing the hardness of the polycarbonate resin, so that the utilization field of the polycarbonate resin can be expanded.

The invention claimed is:

1. A polycarbonate resin having, in a molecule, at least a structural unit represented by the following formula (1), wherein a terminal hydroxyl group concentration of the polycarbonate resin is 300 ppm or less; compounds obtained by alkali hydrolysis of the polycarbonate resin contain at least a compound represented by the following formula (3), in addition to a compound represented by the following formula (2); and an amount of the compound represented by the following formula (3) is from 500 to 7,000 ppm based on all compounds obtained by alkali hydrolysis of the polycarbonate resin:

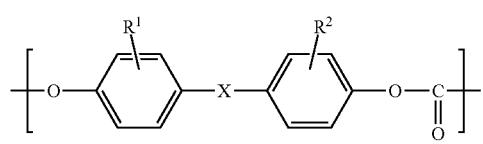

(1)

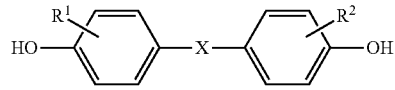

(2)

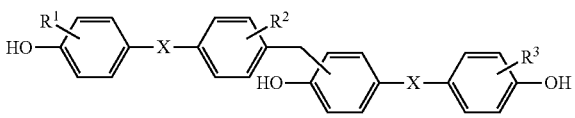

(3)

wherein, each of $R^1$, $R^2$ and $R^3$ represents a methyl group, and X represents a single bond, a carbonyl group, a substituted or unsubstituted alkylidene group, a substituted or unsubstituted sulfur atom, or an oxygen atom; or a polycarbonate resin having, in a molecule, at least a structural unit represented by the following formula (1), wherein a total content of phenol compounds having a carbon number of 6 to 18 in the polycarbonate resin is 100 ppm or less, compounds obtained by alkali hydrolysis of the polycarbonate resin contain at least a compound represented by the following formula (3), in addition to a compound represented by the following formula (2), and an amount of the compound represented by the following formula (3) is from 500 to 7,000 ppm based on all compounds obtained by alkali hydrolysis of the polycarbonate resin:

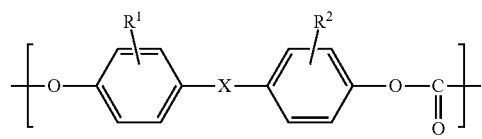

(1)

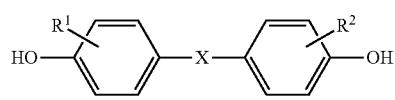

(2)

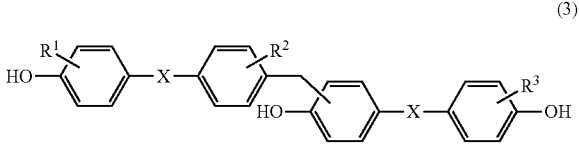

(3)

wherein, each of $R^1$, $R^2$ and $R^3$ represents a methyl group, and X represents a single bond, a carbonyl group, a substituted or unsubstituted alkylidene group, a substituted or unsubstituted sulfur atom, or an oxygen atom.

2. The polycarbonate resin as claimed in claim 1, wherein a chlorine atom content in the polycarbonate resin is 10 ppm or less.

3. The polycarbonate resin as claimed in claim 1, wherein the compounds obtained by alkali hydrolysis of said polycarbonate resin contain a compound represented by the following formula (4) and an amount of the compound represented by the following formula (4) is 1 ppm or more based on all the compounds obtained by alkali hydrolysis of the polycarbonate resin:

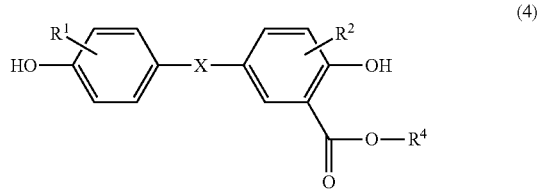

(4)

wherein $R^1$, $R^2$ and X have the same meanings as in formula (1), and $R^4$ represents a hydrogen atom or a methyl group.

4. The polycarbonate resin as claimed in claim 3, wherein a total amount of the compound represented by formula (3) and the compound represented by formula (4), which are contained in the compounds obtained by alkali hydrolysis of said polycarbonate resin, is 500 ppm or more based on all compounds obtained by alkali hydrolysis of the polycarbonate resin.

5. The polycarbonate resin as claimed in claim 3, wherein an amount of the compound represented by formula (4) contained in the compounds obtained by alkali hydrolysis of said polycarbonate resin is, in terms of weight ratio to the compound represented by formula (3), from more than 0 to less than 1.

6. The polycarbonate resin as claimed in claim 1, wherein said polycarbonate resin further contains a structural unit derived from 1,1,1-tris-(4-hydroxyphenyl)ethane.

7. The polycarbonate resin as claimed in claim 1, wherein a viscosity average molecular weight is from 10,000 to 45,000.

8. The polycarbonate resin as claimed in claim 1, wherein said polycarbonate resin is a polycarbonate resin produced by an interfacial polycondensation method.

9. The polycarbonate resin as claimed in claim 1, wherein said polycarbonate resin is a polycarbonate resin obtained by subjecting a polycarbonate resin (A) obtained by an interfacial polycondensation method or a melt polycondensation method to a heat treatment at 260° C. or more.

10. A polycarbonate resin composition containing the polycarbonate resin claimed in claim 1.

11. A molded article obtained by molding the polycarbonate resin composition claimed in claim 10.

12. A molded article obtained by molding the polycarbonate resin claimed in claim 10 by an injection molding method.

13. A molded article obtained by molding the polycarbonate resin claimed in claim 10 by an extrusion molding method.

* * * * *